United States Patent [19]

Merrick et al.

[11] 4,147,920
[45] Apr. 3, 1979

[54] WELDING TORCH AND SUPPORTING APPARATUS

[75] Inventors: George J. Merrick, Franklin; George E. Cook, Brentwood; Donald D. Modglin, Nashville, all of Tenn.

[73] Assignee: Merrick Welding International, Nashville, Tenn.

[21] Appl. No.: 857,225

[22] Filed: Dec. 5, 1977

Related U.S. Application Data

[62] Division of Ser. No. 654,975, Feb. 3, 1976.

[51] Int. Cl.² .............................................. B23K 9/28
[52] U.S. Cl. ............................ 219/137.63; 219/60 A; 219/74

[58] Field of Search ...................... 219/137.63, 137.31, 219/137.61, 137.62, 137.2, 60 A, 125.1, 125.11, 125.12, 60 R, 74, 124.31, 137.9, 60.2

[56] References Cited

U.S. PATENT DOCUMENTS

| 1,827,245 | 10/1931 | Lincoln et al. | 219/125.12 |
| 3,128,369 | 4/1964 | Pilia et al. | 219/137.63 |
| 3,594,534 | 8/1971 | Benfield | 219/60 R |

*Primary Examiner*—J. V. Truhe
*Attorney, Agent, or Firm*—Jones, Thomas & Askew

[57] ABSTRACT

A welding torch assembly including a torch base, and a torch body which can be rapidly removed from the torch base and replaced without the use of tools, and without separately disconnecting welding current, coolant, or shielding gas lines.

2 Claims, 2 Drawing Figures

WELDING TORCH AND SUPPORTING APPARATUS

This is a continuation, division, of application Ser. No. 654,975, filed Feb. 3, 1976.

This invention relates in general to welding and in particular to welding torches of the kind used with automatic or mechanized arc-welding equipment employed for welding workpieces such as pipe joints or the like.

Transmission pipelines are frequently used to transport fluid products for substantial distances, with oil and gas transmission pipelines being but two well-known examples. Such pipelines are generally constructed of individual pipe sections that are joined together by welding, and it is important that each welded pipe joint meet the criteria necessary for safe operation of the pipeline. Not only is the detection and repair of defective joints an extremely expensive undertaking, particularly where the pipeline is buried underground or submerged beneath the sea, but the existence of a defective weld joint creates a hazard of catastrophe in the case of pipelines which carry flammable products.

The separate lengths of pipe which make up an oil or a gas transmission pipeline are typically interconnected by electric-arc welding, and many types of welding techniques are used or proposed in the art for that purpose. Perhaps the simplest welding technique is shielded metal arc welding, commonly known as "stick welding," in which one or more persons manually weld each joint using hand-held welding torches of conventional design. Since each welded joint of a typical pipeline actually consists of several separate weld segments or layers, known as "passes," manual welding techniques are time-consuming and costly in view of the large number of welded pipe joints to be welded in a pipeline extending for many miles. The relative slowness of manual and other conventional welding techniques is particularly troublesome in pipe laying operations where wages and equipment expenses provide a costly overhead which must be rationalized by maximizing the number of acceptable welds that can be produced per unit of time.

The speed at which a pipejoint can be welded is determined by the maximum rate at which the welding torch can deposit weld metal while traversing a pipe joint which is in a nonhorizontal plane. While gas metallic arc (MIG) welding torches generally have a relatively high rate of metal deposition, such torches generally produce welds that are nonuniform and difficult to repeatably obtain. Gas tungsten arc (TIG) welding torches are known to produce a pipe joint weld of superior and more repeatable quality, although the metal deposition rate for TIG welding torches is relatively slow. A development known as the hot-wire TIG torch, in which electric current is passed through the filler wire to preheat the filler wire which is melted in the weld puddle, is known to produce a substantially increased rate of metal deposition, relative to conventional TIG welding. The lack of sufficiently precise and repeatable weld parameter control of prior-art hot-wire TIG welding torches, however, along with the aforementioned problem of off-axis weld puddle control and related problems, have heretofore kept the metal-deposition rates of hot-wire TIG torches from being fully realized in pipeline welding applications. A description of hot-wire TIG welding is set forth in U.S. Pat. No. 3,122,629.

Since welding torches must be periodically reconditioned or repaired, it is desirable for such torches to be easily disconnectable from a movable carriage or other welding equipment. If the torch is repaired without being removed from the welding machine, use of the welding machine is lost for the duration of the repair time. If the torch is removed from the welding machine and replaced by a substitute torch, the welding current supply as well as conduits for coolant and shielding gas must also be disconnected from the old torch and reconnected to the replacement torch.

Accordingly, it is an object of the present invention to provide an improved welding torch and torch supporting apparatus.

It is another object of the present invention to provide a welding torch assembly in which the torch can be quickly disconnected and replaced without use of tools, and without connecting or disconnecting individual power or fluid lines.

Stated in general terms, the present invention comprises a base having an opening into which a torch can be quickly inserted or withdrawn, and further having an electrically conductive surface connectable to a source of weld current. The mating torch fits within the base opening, and has a mating current-conductive surface. Mating openings in the base and the torch communicate fluid flow to the torch.

The foregoing and other objects and advantages of the present invention will become more readily apparent from the disclosed preferred embodiment as described below with respect to the drawings, in which.

Figure 2:
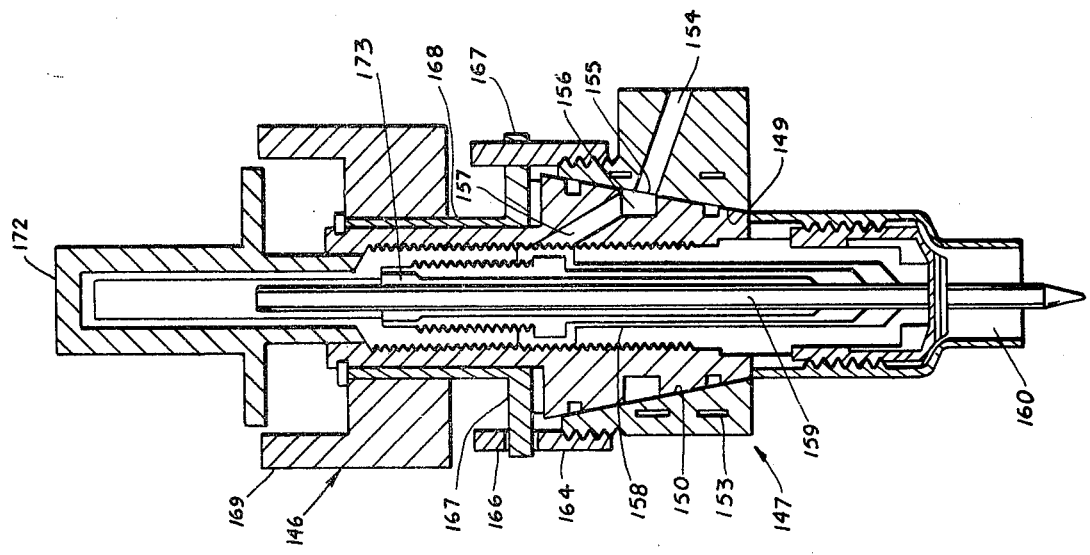
FIG. 2 is section view of a welding torch assembly taken along line 2—2 of FIG. 1.
Figure 1:
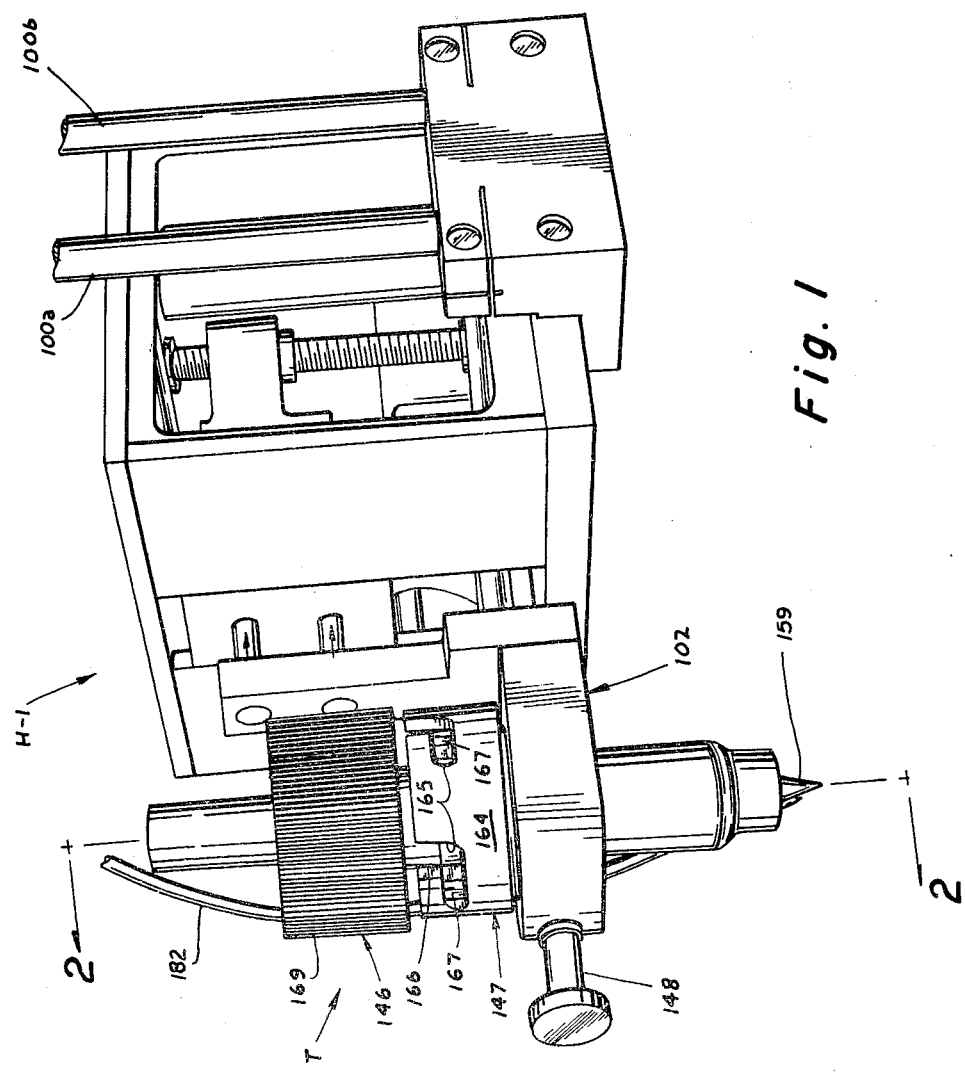
FIG. 1 is a detailed pictorial view of a welding head assembly used in the disclosed embodiment.

The torch assembly T is seen in FIGS. 1 and 2, and includes a torch body 146 that is retained within the torch base 147 by a quick-disconnect attachment which enables the entire torch body to be rapidly removed from the torch base without the use of tools, and without disconnecting welding current, coolant, or shielding gas lines. The torch base 147 is mounted on the torch support 102, which forms part of the welding head assembly H1 mounted at the outer ends of a pair of support rods 100a, 100b which extend to any suitable welding torch mounting apparatus such as a movable carriage or the like. Additional details of one such apparatus are found in copending Application Ser. No. 654,975 filed Feb. 3, 1976. The torch base 147, which is connected to the torch support 102 by the bolt 148, has an internal opening 149 in the shape of a conic section, and the torch body 146 has an external conic portion 150 which mates with the internal opening in the torch base. The torch base 147 and the conic portion 150 of the torch body are made of a material, such as brass or the like, having good electrical and thermal conductivity, and preferably having good resistance to corrosion.

Internal passages 153 are provided within the torch base 147 for circulating a suitable cooling fluid such as water or the like. A gas passage 154 is connectable to receive a conventional arc shielding gas and extends through the torch base 147 to a port 155 on the surface of the internal opening 149. An annular channel 156 is formed in the conic portion 150 of the torch body 146, at a location thereon which mates with the port 155 when the torch body and the torch base are assembled as shown in FIG. 2. A gas passage 157 extends within the torch body 146 from the annular channel 156 to the space defined between the electrode passage 158 and the electrode 159 positioned therein, so that shielding gas entering the gas passage 154 can flow through the passage 157 and vents along the electrode 159 to form a gaseous arc shield at the torch end 160 in the conventional manner. The annular channel 156 enables the torch body 146 to be installed within the torch base 147 without regard to alignment of passages for the shielding gas.

A cylindrical lock ring 164 is affixed to the torch body 147 and has several cam slots 165 which are open as at 166 to the upper end of the lock ring. Four such cam slots 165 are provided in the lock ring 164 of the disclosed embodiment, and the torch body 146 has a corresponding number of cam fingers 167 which are received into the cam slots through the open portions 166. The fingers 167 extend radially outwardly from the lower end of the sleeve 168 which surrounds the electrode passage 158. A threaded connection is provided between the lock ring 164 and the torch base 147, so that the vertical position (as seen in FIG. 2) of the cam slots 165 can be adjusted as necessary to ensure that the conic portion 150 of the torch body 146 becomes firmly seated within the internal opening 149 of the torch base 147 before the cam fingers 167 reach the inner ends of the respective cam slots 165.

Secured to the upper end of the sleeve 168 is the ring 169, which preferably has a roughened external surface of sufficient diameter to be easily grasped and turned by a person wearing gloves or mittens. The ring 169 may be made of an insulating material such as phenolic, so that the ring can be held while inserting or removing the torch body 146 from the base 147 without exposure to welding voltage which is typically applied to the entire torch base.

An electrode adjusting knob 172, which may also be made of an insulating material, extends concentrically upwardly from the ring 169 and provides a threaded connection with the collet mechanism 173 which retains the electrode 159 within the passage 158 of the torch body. The electrode 159 is thus longitudinally movable relative to the torch end 160 by rotating the knob 172. Details of the collet mechanism 173 are conventional and need not be described further herein.

Since the entire torch body 146 is readily removable from the torch base 147 simply by a quarter-turn of the ring 169, without using any tools or disconnecting any connections to the torch body, on-site replacement of an electrode 159 can be made simply by substitution of an entire torch body 146. The removed torch body can then receive a new electrode in a repair shop, where the replacement electrode can be longitudinally preadjusted to a gauge corresponding to the position of a pipe joint J with respect to the torch base 147, while the torch assembly T continues operating with the substitute torch body, thereby minimizing the downtime of the torch assembly.

It will be understood that the foregoing relates only to a preferred embodiment of the present invention, and that numerous changes and modifications may be made therein without departing from the spirit and the scope of the invention as set forth in the following claims.

We claim:
1. Apparatus for removably supporting a welding torch, comprising:
base means having a torch receiving opening at least partially defined by a first surface;
said first surface being electrically conductive and being connectable to a source of welding current;
a welding torch including a support portion which fits within said torch receiving opening;
said support portion having an electrically conductive second surface which mates with and contacts said first surface;
said welding torch including electrode support means in electrically conductive relation with said second surface to receive said welding current; and
cam means operatively engaging said welding torch, when received within said torch receiving opening, and operative in response to rotation of said welding torch relative to said base means to retain said support portion within said torch receiving opening and to firmly seat said second surface against said first surface.
2. Apparatus as in claim 1, wherein:
said first and second surfaces comprise complementary truncated conic surfaces;
one of said surfaces having an opening connectable to receive a supply of fluid; and
the other of said surfaces having an annular fluid receiving channel which extends around the corresponding said conic surface for alignment with said fluid opening when said welding torch is retained in said base means.

* * * * *